US 10,990,826 B1

United States Patent
Haider et al.

(10) Patent No.: US 10,990,826 B1
(45) Date of Patent: Apr. 27, 2021

(54) OBJECT DETECTION IN VIDEO

(71) Applicant: Xilinx, Inc., San Jose, CA (US)

(72) Inventors: Mujib Haider, San Jose, CA (US); Venkata V. Dhanikonda, Santa Clara, CA (US); Ashish Sirasao, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 96 days.

(21) Appl. No.: 16/358,930

(22) Filed: Mar. 20, 2019

(51) Int. Cl.
*G06K 9/00* (2006.01)
*G06F 17/15* (2006.01)
*G06T 7/246* (2017.01)
*G06N 3/04* (2006.01)

(52) U.S. Cl.
CPC ......... *G06K 9/00718* (2013.01); *G06F 17/15* (2013.01); *G06K 9/00201* (2013.01); *G06K 9/00664* (2013.01); *G06N 3/04* (2013.01); *G06T 7/251* (2017.01)

(58) Field of Classification Search
None
See application file for complete search history.

(56) References Cited

U.S. PATENT DOCUMENTS

| 5,872,604 A * | 2/1999 | Ogura | H04N 19/56 348/699 |
| 8,446,524 B2 * | 5/2013 | Chen | H04N 19/577 348/441 |
| 2002/0048395 A1 * | 4/2002 | Harman | H04N 13/128 382/154 |
| 2009/0232213 A1 * | 9/2009 | Jia | G06T 3/4053 375/240.16 |
| 2013/0050572 A1 * | 2/2013 | Swan | H04N 7/0127 348/441 |
| 2016/0267690 A1 * | 9/2016 | Bai | G06T 7/60 |
| 2016/0364617 A1 * | 12/2016 | Silberschatz | A61B 5/1113 |

OTHER PUBLICATIONS

Han et al., "Seq-NMS for Video Object Detection", aarXiv preprint arXiv:1602.08465, Feb. 26, 2016, 9 pg.
Kang et al., "T-CNN: Tubelets With Convolutional Neural Networks for Object Detection From Videos," arXiv:1604.02532, Aug. 2017, 11 pg.
Lucas et al., "An Iterative Image Registration Technique with an Application to Stereo Vision," Proceedings of Imaging Understanding Workshop, 1981, pp. 121-130.
Sayani et al., "Smart Surveillance Tech Demo XDF," Xilinx, Inc., Xlilinx Developer Forum, Oct. 2018, 6 pg.
Zhu et al., "Flow-guided feature aggregation for video object detection," In Proc. of the IEEE Int'l Conf. on Computer Vision, 2017, pp. 408-417.

* cited by examiner

*Primary Examiner* — Hadi Akhavannik
(74) *Attorney, Agent, or Firm* — Kevin T. Cuenot

(57) ABSTRACT

Detecting objects in video may include receiving object detections for a plurality of selected frames of a video from a still image detector, wherein the plurality of selected frames are non-adjacent frames of the video, propagating the object detections from the plurality of selected frames to sequential frames of the video adjacent to the plurality of selected frames based on a distance metric and vector flow data for the sequential frames, suppressing false positive object detections from the propagating, and outputting resulting object detections for the sequential frames of the video.

15 Claims, 7 Drawing Sheets

400

Receive, from a still image detector, object detections for a plurality of selected frames of a video, wherein the plurality of selected frames are non-adjacent frames of the video
402

Propagate the object detections from the plurality of selected frames to sequential frames of the video adjacent to the plurality of selected frames based on a distance metric and vector flow data for the sequential frames
404

Suppress false positive object detections from the propagating of block 404
406

Output resulting object detections for frames of the video.
408

400

---

Receive, from a still image detector, object detections for a plurality of selected frames of a video, wherein the plurality of selected frames are non-adjacent frames of the video
402

---

Propagate the object detections from the plurality of selected frames to sequential frames of the video adjacent to the plurality of selected frames based on a distance metric and vector flow data for the sequential frames
404

---

Suppress false positive object detections from the propagating of block 404
406

---

Output resulting object detections for frames of the video.
408

FIG. 4

OBJECT DETECTION IN VIDEO

TECHNICAL FIELD

This disclosure relates to image processing and, more particularly, to object detection in video.

BACKGROUND

Object detection refers to computer vision and/or image processing technologies in which instances of semantic objects of particular classes are detected in digital images and/or videos. Examples of different classes of semantic objects that may be detected include humans, buildings, or cars. The term "semantic object" refers to a representation of a collection of attributes that describe an identifiable thing, e.g., a physical object, in an environment.

Object detection is often used to classify and/or localize objects in an image and/or video. Typically, an object detector is implemented as a trained convolutional neural network (CNN). The structure of a CNN configured for object detection may include a succession of 3-dimensional filters that operate on a sliding window across the spatial dimensions of an input image or frame.

The CNN is often included within a larger object detection pipeline or system. The pipeline may include a pre-processing stage, an object detection stage (e.g., the CNN), and a post-processing stage. The pre-processing stage may perform operations on the image or frame prior to processing by the CNN. These operations may include color space conversion and/or scaling. The post-processing stage may perform one or more operations on the output generated by the object detection stage. For example, the post-processing stage may operate on the CNN output layer.

In general, the accuracy of object detection correlates directly to the resolution of the input image. In an effort to increase object detection accuracy, high definition and ultra-high definition images are often processed. When processing these types of high-resolution images, the CNN in the object detection pipeline is often the limiting factor for processing video in real-time.

SUMMARY

A method may include receiving object detections for a plurality of selected frames of a video from a still image detector, wherein the plurality of selected frames are non-adjacent frames of the video, propagating the object detections from the plurality of selected frames to sequential frames of the video adjacent to the plurality of selected frames based on a distance metric and vector flow data for the sequential frames, suppressing false positive object detections from the propagating, and outputting resulting object detections for the sequential frames of the video.

A system includes a processor configured to initiate operations. The operations may include receiving object detections for a plurality of selected frames of a video from a still image detector, wherein the plurality of selected frames are non-adjacent frames of the video, propagating the object detections from the plurality of selected frames to sequential frames of the video adjacent to the plurality of selected frames based on a distance metric and vector flow data for the sequential frames, suppressing false positive object detections from the propagating, and outputting resulting object detections for the sequential frames of the video.

A method may include receiving object detections for a plurality of sequential frames of a video from a still image detector and, for each sequential frame of the plurality of sequential frames, propagating an object detection to frames adjacent to the sequential frame using motion guided propagation and a selected distance metric. The method may include suppressing false positive object detections from the propagating and outputting resulting object detections for the plurality of frames of the video.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 4 illustrates another example method of detecting objects within video.

DETAILED DESCRIPTION

Figure 1:
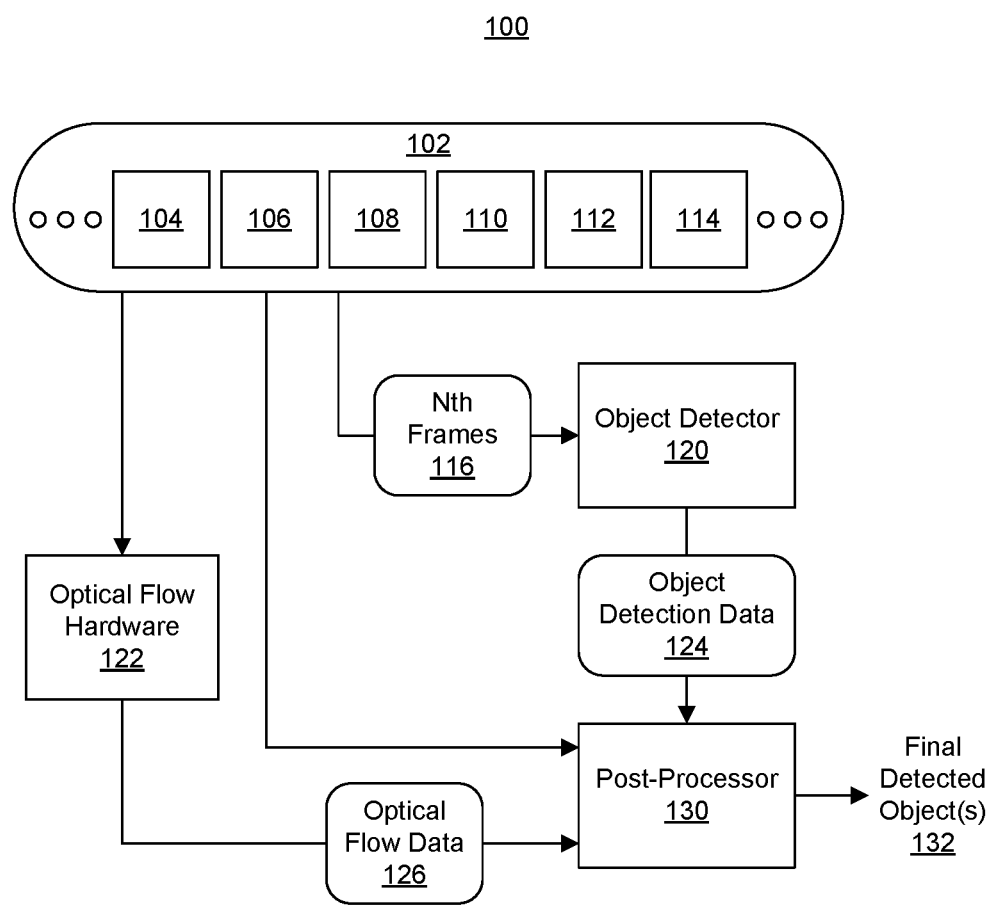
FIG. 1 illustrates an example of an object detection system for processing video.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to image processing and, more particularly, to object detection in video. In accordance with the inventive arrangements described within this disclosure, an object detection system is provided that is capable of detecting objects within video. The object detection system is capable of leveraging the spatiotemporal coherency of video to improve accuracy and real-time performance of object detection. The object detection system may include an object detector that is capable of processing video at a frame rate that is lower than the frame rate of the video itself. The object detector is capable of processing selected frames of video, e.g., every Nth frame of video where N is an integer value of 2 or more. For example, the object detector is capable of processing every other frame of video (e.g., every second frame) or every third frame of video. By operating on only selected frames of video, e.g., a subset of the frames of the video or non-adjacent frames of the video, the object detector is capable of providing real-time operation and increased throughput. Processing only selected frames of video as described is referred to within this disclosure as "duty cycling" the object detector.

The object detection system may include a post-processing stage. The post-processing stage may be used in a standalone manner or with an object detector as described herein. The post-processing stage is capable of using spatiotemporal features of the video to improve performance of the object detection system. The post-processing stage is capable of interpolating object detections in the particular frames processed through the object detector to pass or propagate such object detections to adjacent or neighboring frames of the video not processed through the object detector.

The post-processing stage is also capable of combining the interpolation with non-maximal suppression techniques to filter false positive object detections that arise from the interpolation. By processing fewer than all frames of the video through the object detector and applying the post-processing described herein, the inventive arrangements are capable of achieving an object detection accuracy that rivals the object detection accuracy of a still image object detector that performs object detection on each frame of the video, while still being capable providing real-time operation.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of an object detection system (system) 100 for processing video. In the example of FIG. 1, system 100 includes an object detector 120, optical flow hardware 122, and a post-processor 130.

Object detector 120 is capable of receiving video 102. Video 102 includes a plurality of time-sequenced, or sequential, frames illustrated in FIG. 1 as frames 104, 106, 108, 110, 112, and 114. As defined within this disclosure, the term "sequential" as applied to frames of video, means time ordered frames of video without skipping or excluding any frame or frames of the video in a given segment or span of frames or video described as sequential. For purposes of description within this disclosure, frames of video may also be referred to as images from time-to-time. Video 102 may include fewer or more frames than shown in FIG. 1. In the example of FIG. 1, object detector 120 may be duty cycled, e.g., configured to operate only on selected frames of video 102. For example, object detector 120 may operate on every Nth frame of video 102 shown as Nth frames 116. In the case where object detector 120 is duty cycled, the value of N may be set to an integer value that is 2 or more than 2. Object detector 120 performs no object detection for the other frames of video 102 (e.g., no object detection for the non-selected frames). That is, object detector 120 performs object detection on fewer than all of the frames of video 102.

In other cases, object detector 120 is not duty cycled. In such cases, N may be set to 1. With N set to 1, object detector 120 is capable of running at full rate. This mode of operation may be used to improve overall accuracy of system 100 in terms of recall and/or precision, but does not improve performance in terms of frames per second.

As an illustrative example, object detector 120 may receive each Nth frame where N=2. In that case, where frame 104 is the first frame, Nth frames 116 include frames 104, 108, and 112, and so on. In this example, frames 106, 110, and 114 are not processed through object detector 120. In another example, object detector may receive each Nth frame where N=3. In that case, where frame 104 is the first frame, Nth frames 116 include frames 104, 110, and so on. In this example, frames 106, 108, 112, and 114 are not processed through object detector 120. The value of N may be set to values other than 2 or 3. Frames other than the Nth frames 116 are not processed through object detector 120. In an alternative example, object detector 120 receives all frames but does not perform object detection on frames other than the Nth frames 116, e.g., where the non-selected frames are permitted to pass through object detector 120.

In one example implementation, selected frames of video 102, e.g., Nth frames 116, may be processed through object detector 120 by duty cycling object detector 120. For example, a control circuit (not shown) may be included in system 100 and/or within object detector 120 that is configured to enable object detector 120 to accept each Nth frame of video as an input. In another example implementation, a circuit may be included that is capable of parsing out each Nth frame of video and providing only each Nth frame of video to object detector 120. In any case, object detector 120 is capable of performing object detection only on the selected, e.g., each Nth, frame of video 102. This effectively results in object detector 120 operating at a frame rate that is lower than the frame rate of video 102, but results in a greater throughput and an ability to operate in real-time with video 102.

In one example, object detector 120 is implemented as a still image detector. More particularly, object detector 120 is configured to operate on still images, e.g., individual frames of video. Many video applications rely on still image detectors in view of their widespread availability and relative ease to train. As defined within this disclosure, a "still image detector" such as object detector 120 does not maintain any state information between the images (e.g., frames) that are processed. In this regard, object detector 120, though capable of processing individual frames of video 102, is unaware of any shared state information among the frames that may arise from commonalities in the spatiotemporal features of video 102.

An example implementation of object detector 120 that is a still image detector is a neural network. Often, a still image detector is implemented as a convolutional neural network (CNN) that has been trained to detect particular classes of semantic objects. In general, a CNN includes a succession of 3-dimensional filters that operate on a sliding window across the spatial dimensions of the input frame. As such, object detector 120 may be implemented as a CNN. In some cases, images are pre-processed prior to being fed to the CNN. Pre-processing may involve operations including, but not limited to, color space conversion and scaling.

An example of the spatiotemporal features of video 102 is that an object recognized in one frame of video 102 will likely be within the next sequential frame of video 102 albeit in a different location due to the motion of the object. A car that is in motion and included in frame 104, for example, will likely be included in frame 106. The location of the car in frame 106 relative to frame 104 will be different due to motion of the car.

In one example, object detector 120 is implemented using dedicated circuitry that may be fixed or hardwired. In another example, object detector 120 is implemented using programmable circuitry that has been configured to perform the operations described in connection with object detector 120. In another example, object detector hardware 120 is implemented as a processor that is capable of executing program code.

For each frame of video 102 that is processed through object detector 120, object detector 120 is capable of outputting a result shown as object detection data 124 to post-processor 130. In one aspect, object detection data 124 specifies object detections from Nth frames 116. For example, object detection data 124 may include the output layer of the CNN used to implement object detector 120 for each of Nth frames 116 that are processed. Object detection data 124 may specify a 3-dimensional volume of encoded box data. Box data refers to an object (or class of semantic object) that is detected within a frame, an (x, y) coordinate for the object, and a width and a height of a rectangle referred to as a "bounding box" encompassing the detected object in the frame. Object detection data 124 may also specify a class probability for each object. The class probability indicates how confident object detector 120 is that the detected object is correct. As an example, the class probability may be specified as a value between 0 and 1. As defined within this disclosure, the term "object detection" means the class of semantic object detected, the box data (e.g., a coordinate of the semantic object, the bounding box of the semantic object specified as a width and a height relative to the coordinate of the center of the box), and the class probability of the semantic object.

Object detection data 124 may not specify any object detections in the event no objects are detected in the frame being processed. Object detection data 124 may specify one or more object detections in the event that one or more objects are detected in the frame being processed. The maximum number of objects that may be detected in a given frame of video 102 depends on the particular type of object detector that is used.

Optical flow hardware 122 is capable of performing a dense optical flow on video 102. Dense optical flow is an image processing technique that is operable across all of the pixels of an image (e.g., a frame). Optical flow hardware 122, in performing dense optical flow, is capable of providing an estimate of motion for pixels from one frame of video 102 to a next sequential frame of video 102. Optical flow hardware 122 is capable of performing dense optical flow to generate optical flow data 126 for sequential frames of video 102. Optical flow data 126 may include motion vectors for parts of frames of video 102 that are processed and that exhibit motion between successive, or sequential, frames of video 102. In this regard, optical flow hardware 122 is capable of performing dense optical flow to generate the motion vectors for each pixel of the input frames and output the motion vectors as optical flow data 126.

The "Lucas-Kanade" technique, as disclosed by Lucas et al., "An Iterative Image Registration Technique with an Application to Stereo Vision," Proceedings of Imaging Understanding Workshop, pps. 121-130 (1981), is an example of a technique for performing dense optical flow. In general, the Lucas-Kanade technique solves a linear system of equations that includes sums of spatial and temporal image gradients or derivatives. The spatial and temporal derivatives are summed up over a sliding window. Larger window sizes generally provide increased quality of results in the resulting estimates of the motion vectors. For example, larger window sizes generally produce motion vectors with greater accuracy and lower noise than smaller window sizes. It should be appreciated that other techniques for solving the optical flow problem and generating motion vectors for pixels of input frames of video 102 may be used and that the particular techniques described herein are for purposes of illustration only.

In one example, optical flow hardware 122 is implemented using dedicated circuitry that may be fixed or hardwired. In another example, optical flow hardware 122 is implemented using programmable circuitry that has been configured to perform the operations described in connection with optical flow hardware 122. In another example, optical flow hardware 122 is implemented as a processor that is capable of executing program code.

Post-processor 130 is capable of performing a variety of different operations. In general, post-processor 130 is capable of performing operations such as box extraction from the CNN output layer and Non-Maximal Suppression. Post-processor 130, which operates on sequential frames of video, e.g., all of the frames as opposed to only selected frames or Nth frames 116, is capable of synchronizing object detection data 124 with the sequential frames of video 102.

In an example implementation, post-processor 130 includes a plurality of stages. The stages may include an intra-frame processing stage and an inter-frame processing stage. The intra-frame processing stage performs operations relating to individual frames of video 102, e.g., operates on frames of video 102 in isolation or individually. The inter-frame processing stage performs operations that span across a plurality of sequential frames of video 102.

In the example of FIG. 1, post-processor 130 receives object detection data 124, video 102, and optical flow data 126. In one example, post-processor 130 is capable of outputting final detected objects 132. In other examples, post-processor 130 is capable of outputting other varieties of data that may be selected based on system settings and/or configurations. Post-processor 130, for example, is capable of outputting frames of video 102 synchronized with final detected objects 132.

In one example, post-processor 130 is implemented using dedicated circuitry that may be fixed or hardwired. In another example, post-processor 130 is implemented using programmable circuitry that has been configured to perform the operations described in connection with post-processor 130 herein. In another example, post-processor 130 is implemented as a processor that is capable of executing program code, where the operations described in connection with post-processor 130 are implemented through execution of the program code.

Figure 2:
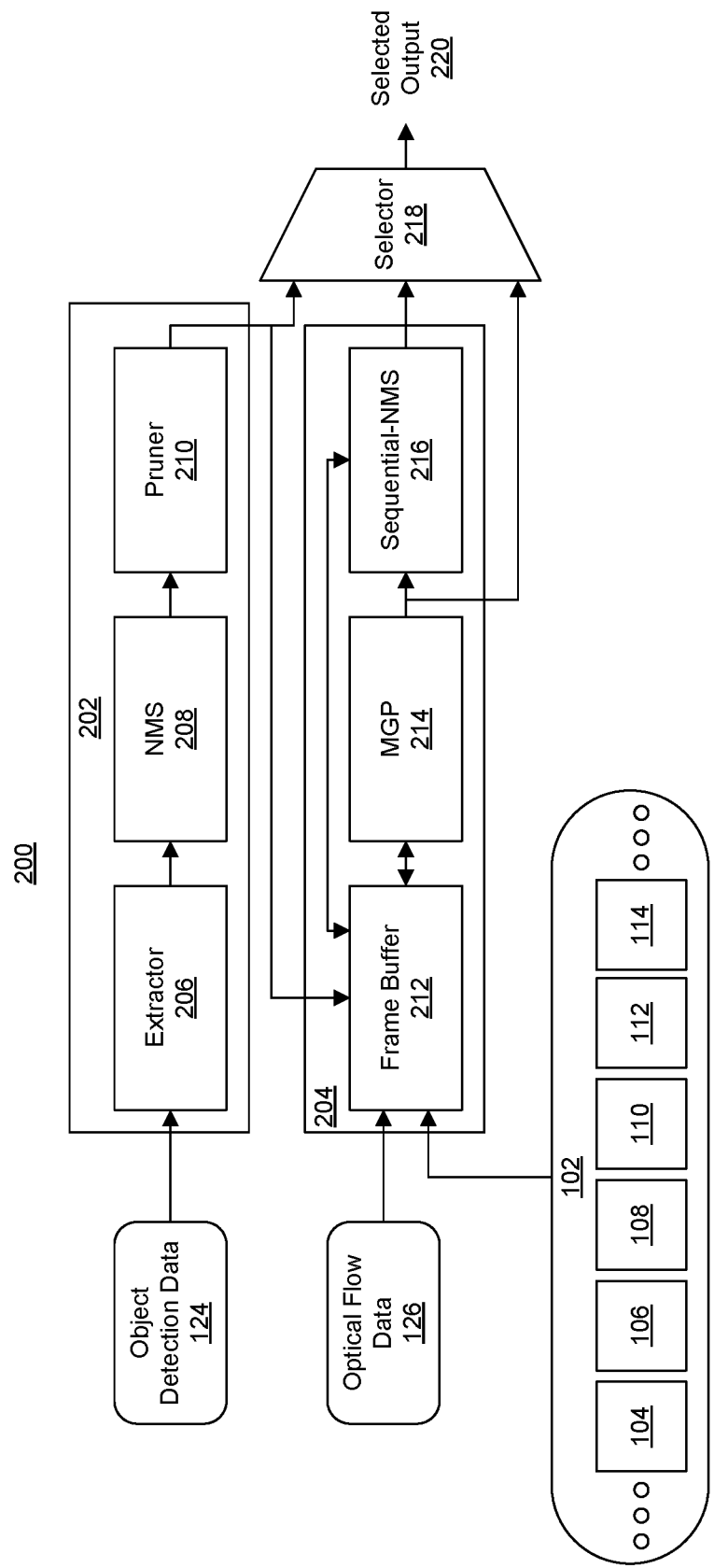
FIG. 2 illustrates an example implementation of a post-processor for an object detection system.

FIG. 2 illustrates an example implementation of a post-processor 200 for an object detection system. Post-processor 200 may be used to implement post-processor 130 described in connection with FIG. 1.

In the example of FIG. 2, post-processor 200 includes an intra-frame processing stage 202 and an inter-frame processing stage 204. Intra-frame processing stage 202 includes an extractor 206, a non-maximal suppressor (NMS) 208, and a pruner 210. Inter-frame processing stage 204 includes a frame buffer 212, a motion guided propagator (MGP) 214, and a sequential-non-maximum suppressor (sequential-NMS) 216. Post-processor 200 further may include a selector 218 that is capable of providing, as selected output 220, data from pruner 210, data from MGP 214, or data from sequential-NMS 216. Such data may be output in combination and synchronized with sequential frames of video 102.

Extractor 206 is capable of receiving object detection data 124 from an object detector. Extractor 206 is capable of extracting or parsing object detections from object detection data 124. For example, in the case where the object detector is implemented as a CNN, extractor 206 is capable of parsing the output layer of the CNN. Extractor 206 is capable of translating the output layer into a format, e.g., object detections, that is more accessible by the remaining portions of intra-frame processing stage 202.

In one aspect, extractor 206 is capable of including a flag (e.g., a bit) for each object detection of a frame. The flag indicates whether the object detection was generated, or determined, by the object detector. Thus, for each object detection for a frame processed by the object detector and received by intra-frame processing stage 202, extractor 206 is capable of setting this flag. The flag is propagated through post processor 200 as part of each object detection and used in inter-frame processing stage 204 as described in greater detail below.

NMS 208 is capable of suppressing false positive object detections in a frame. A false positive object detection is where an object detector detects an object in a frame in a particular region or at a particular location where no such object exists in the frame. False positive object detections may occur due to motion blur or occlusion in the image. Occlusion refers to the case where another object passes (e.g., is superposed over) the object being detected so that at least a portion of the object being detected is obscured (e.g., partially or fully hidden).

In the example of FIG. 2, NMS 208 is capable of suppressing false positive object detections by performing multi-context suppression. In one aspect, NMS 208 is capable of analyzing the object detections of a frame of video that has been processed through the object detector. NMS 208 is capable of applying a threshold to the class probabilities for the object detections. For example, NMS 208 compares the class probability of each object detection with a threshold class probability. For each object detection having a class probability that does not exceed the class probability threshold, NMS 208 is capable of reducing the class probability of the object detection by a predetermined value. In another example, the NMS 208 reduces the class probability of the object detection to zero.

NMS 208 is further capable of suppressing false positives by selectively removing detections that have class probabilities below a threshold and detections with a high degree of overlap (e.g., based on intersection over union or "IOU") within a frame. As an example, in some cases an object detector will generate multiple detections for a single (e.g., same) object within an image. A single car in an image, for example, may be detected multiple times, e.g., as multiple distinct cars. Often, these multiple object detections for a same semantic object have overlapping box data. NMS 208 is capable of analyzing the IOU of the overlapping object detections (e.g., the overlap of the object detections using the box data for each object detection) for a given frame.

In general, NMS 208 is capable of placing overlapping object detections of the same class into a same group. For each group, NMS 208 is capable of selecting one of the object detections in the group. In an example, NMS 208 is capable of selecting one of the object detections in the group based on the highest confidence score. The object detections of each group that are not selected for the frame being processed are suppressed (e.g., discarded). NMS 208, for example, is capable of suppressing overlapping objects with an IOU that is below a particular IOU threshold.

In another example, NMS 208 is capable of performing the suppression based on the class probabilities prior to suppressing multiple object detections of the same semantic objects. For example, NMS 208 is capable of first performing suppression based on the class probabilities and, of the remaining object detections for the frame being processed, perform the suppression of multiple object detections of the same semantic object using the IOU technique.

Pruner 210 is capable of processing the remaining detections in a given frame as received from NMS 208. Pruner 210 is capable of removing those object detections that have been suppressed by NMS 208 from the data set for the current frame being processed. In the example of FIG. 2, an output from pruner 210 is coupled to selector 218. The output of pruner 210 is also coupled to inter-frame processing stage 204 and, more particularly, to frame buffer 212. Selector 218 may be configured to output, as selected output 220, the output from pruner 210, the output from MGP 214, or the output from sequential-NMS 216.

Frame buffer 212 may be implemented as a circular buffer in a memory. Frame buffer 212 is capable of storing two or more frames of video 102 and data for the frames. For example, for each frame stored in frame buffer 212, frame buffer 212 may also store optical flow data 126 for the frame and the processed object detection data output from intra-frame processing stage 202. Frames of video 102 stored in frame buffer 212 may be processed and/or accessed by both MGP 214 and sequential-NMS 216.

As discussed, the motion vectors for frames in optical flow data 126 indicate the direction that a detected object is moving from one frame to another. The motion vectors describe the displacement of each pixel in an object from a current frame to a next sequential fame in video 102. In general, the motion vectors are specified for each pixel in a frame. MGP 214 is capable of using the motion vectors to calculate a displacement for each detected object in a given frame relative to another frame, e.g., a next sequential frame or an immediately prior frame. In one example, for each object detection in a frame, MGP 214 calculates an average for the bounding box. MGP 214 uses frame buffer 212 to determine a flow for each bounding box for the current frame to an immediately prior frame and for the current frame to the next sequential frame—e.g., the immediately adjacent frames. MGP 214 effectively propagates object detections for a selected frame bidirectionally (e.g., forward and backward to sequential frames) based on the averages determined for the bounding box of each object detection.

In propagating object detections, the original object detections for frames processed by the object detector have the flag set. When MGP 214 propagates an object detection to a different frame, MGP 214 clears the flag for the object detection that is propagated. For example, MGP 214 propagates an object detection from a first frame to a second frame. The object detection, e.g., the copy of the object detection, that is propagated and associated with the second frame has a flag that is cleared by the MGP 214 indicating that the object detection is not an original object detection, while the flag of the object detection for the first frame remains set. Object detections that are original for a frame maintain the flag as being set. Object detections that have a cleared flag are not re-propagated by MGP 214. In other words, only the original detections are propagated to avoid ripples.

In illustration of the propagation of object detections to adjacent frames bidirectionally, consider the case where frames 104, 108, and 112 were processed through the object detector, but frames 106, 110, and 114 were not. In this illustration, while there is object detection data output from intra-frame processing stage 202 for frames 104, 108, and 112, there is no such data for frames 106, 110, or 114. MGP 214 is capable of using the optical flow data 126 for frames 104 and 106 to propagate object detections output from intra-frame processing stage 202 for frame 104 to frame 106. MGP 214 is capable of using the optical flow data for frames 104 and the frame immediately prior to frame 104 (not shown) to propagate object detections output from intra-frame processing stage 202 for frame 104 to the immediately prior frame. Similarly, MGP 214 is capable of using the optical flow data for frames 106 and 108 to propagate object detections output from intra-frame processing stage 202 for frame 108 to frame 106; and to use the optical flow data for frames 108 and 110 to propagate object detections output from intra-frame processing stage 202 for frame 108 to frame 110. The optical flow data may be used to determine the location of the propagated object detection in the target frame(s). MGP 214 may perform similar operations for the other frames depending on the value of N. In this example, N=2. In other cases were N=3, object detections for frames processed through the object detector may be propagated to more than one adjacent frame (e.g., object detections for frame 110, if processed through the object detector with N=3 may be propagated to frames 106 and 108 and to frames 112 and 114). In performing the propagation described, MGP 214 uses the motion vectors to reduce false negatives. False negatives refer to missing object detections for semantic objects in a frame that should have been detected by the object detector or that may have been detected if processed through the object detector. MGP 214 reduces false negatives in for both situations.

MGP 214 is further capable of performing suppression. The propagation of detected objects to adjacent frames may result in overlaps of detected objects. MGP 214 is capable of removing these overlaps using a method similar to NMS 208. For example, consider frame 106 where N=2. Frame 106 has object detections propagated from both frames 104 and 108. If propagated detections in frame 106 have an overlap (based on IOU metric) greater than a threshold, then the object detections are candidates for suppression. The object detection candidate with the highest class score is kept, while the rest of the object detection candidates are suppressed. If an object detection candidate has a non-cleared detection flag, then the object detection candidate takes precedence and all other object detections are suppressed. This way the original object detection is given priority over propagated object detections from MGP 214.

In another aspect, sequential-NMS 216 is capable of distinguishing between original object detections and object detections that were propagated to a frame by MGP 214. As discussed, part of the data that is propagated with a frame is a flag for each object detection indicating whether the object detection is an original detection from the object detector or an object detection from propagation. Thus, original object detections in a frame have this flag set, while any object detections that are propagated to the frame by MGP 214 do not have this flag set. In an example, sequential-NMS 216 is capable of favoring original detections when determining the optimal sequence. Sequential-NMS 216, for example, is capable of increasing the weight (e.g., the IOU) for the original detections. The increase may be performed by applying a predetermined factor greater than one or by adding a predetermined value to weights corresponding to object detections from the object detector (as opposed to propagated object detections). In this manner, post-processor 200 is capable of favoring original detections from the object detector over propagated detections as being likely more accurate.

Example techniques for performing multi-context suppression and high confidence tracking are described in greater detail in Kang et al., "T-CNN: Tubelets with Convolutional Neural Networks for Object Detection from Videos", arXiv:1602.08465 [cs.CV] (August 2016) (hereafter "Kang").

Sequential-NMS 216 is capable of operating across a plurality of different sequential frames of video 102 stored in frame buffer 212 after operation of MGP 214. The number of frames across which sequential-NMS 216 operates, referred to as the "depth", is an adjustable parameter. For purpose of illustration, consider the case where the depth is 3 such that sequential-NMS 216 operates across 3 sequential frames of video 102. Sequential-NMS 216 is capable of building a graph by forming adjacencies between bounding boxes in the group of 3 frames. Sequential-NMS 216 is capable of using IOU between bounding boxes in adjacent frames. Object detections in adjacent frames, e.g., in the group of 3 adjacent frames in this example, are considered to be the same when the IOU that is determined is above a threshold IOU. For purposes of illustration, the threshold IOU may be 0.5. In other examples, the threshold IOU used in sequential-NMS 216 may be higher or lower. Sequential-NMS 216 builds a graph (e.g., an adjacency graph) connecting the bounding boxes corresponding to the same object in the sequence of 3 frames using this technique. Sequential-NMS 216 further is capable of determining an optimal sequence of bounding boxes through the group of sequential frames from one endpoint of the group of frames to the next endpoint (e.g., from the bounding box in the first of the three frames to the bounding box in the last of the three frames). The optimal sequence may be one with a highest sum of IOUs between adjacent frames for the recognized object. Those recognized objects that overlap (e.g., correspond to a same semantic object in the frame) that are not used in building the optimal sequence are suppressed. This operation reduces false positives within the frames.

As an illustrative and nonlimiting example, after constructing the adjacency graph, sequential-NMS 216 finds optimal sequences and rescores the optimal sequences. Sequential-NMS 216 is capable of starting with a detection at the beginning of the sequence and traversing all possible paths. Sequential-NMS 216 selects the path with the highest sum of class scores as the optimal sequence. Sequential-NMS 216 sets a "keep" flag for the objects in the optimal sequence and rescores the optimal sequence using a scoring technique such as an average of the scores across the sequence, the best score across the sequence, or other scoring technique. Sequential-NMS 216 is capable of repeating this process for each object at the beginning of the sequence. Sequential-NMS 216 decides to suppress an object only on the first frame in a sequence by removing objects that do not have the keep flag set.

An example technique for performing the process implemented by sequence-NMS 216 is described in greater detail in Han et al., "Seq-NMS for Video Object Detection", arXiv:1602.08465 [cs.CV], (Feb. 26, 2016).

Continuing with FIG. 2, selector 218 is capable of providing as selected output 220 the output generated by pruner 210, the output generated by MGP 214, or the output generated by sequential-NMS 216.

In the example of FIG. 2, sequential-NMS 216 is operative subsequent to MGP 214. MGP 214, in performing propagation and contending with false negatives, may propagate false positives. In this regard, positioning sequential-NMS 216 subsequent to MGP 214 is operative to suppress any false positives that may have been propagated by MGP 214. Improved accuracy is obtained by performing the interpolation implemented by MGP 214 prior to sequential-NMS 216. Combining MGP 214 with sequential-NMS 216 in the order shown provides an additive increase in the overall mean Average Precision (mAP) score achieved by the system where MGP 214 increases the recall while sequential-NMS 216 increases precision.

In the examples described herein in connection with FIG. 2, MGP 214 uses a distance setting. The distance setting may depend on the value of N. As an illustrative and nonlimiting example, the distance used by MGP 214 may be N−1. If, for example, the object detector processes every other frame (e.g., N=2), then the distance metric for MGP 214 may be set to 1. A distance metric of 1 means that MGP 214 propagates object detections in a selected frame of video to one frame immediately prior to the selected frame and to one frame immediately following the selected frame in the sequential video using optical flow data 126. A distance metric of 2 (e.g., where N=3) means that MGP 214 propagates recognized objects in a selected frame of video to the two frames immediately prior to the selected frame and to the two frames immediately following the selected frame in the sequential video using optical flow data 126. The distance metric may also be set to 3. In general, where N is greater than 1, the distance metric may be determined as N/2 Distance Metric N−1, when N is even; and (N−1)/2 Distance Metric N−1, when N is odd.

The depth of sequential-NMS 216 may be set to a value that is dependent on the distance metric used by MGP 214. In one example, inter-frame processing stage 204 may be configured so that the depth used by sequential-NMS 216 is set to a value of 2*(MGP distance)+3. Thus, with a distance metric of 1, the depth of sequential-NMS 216 is set to 5 (e.g., where sequential-NMS 216 operates on 5 sequential frames). Using a sufficiently large value of depth allows sequential-NMS 216 to filter out false positives propagated by MGP 214. With a distance of 1, for example, interpolation as performed by MGP 214 may propagate object detections to adjacent frames potentially creating false positive sequence of 3 frames. Picking a depth for sequential-NMS 216 of 5 in this case ensures that false positive object detections from interpolation are suppressed.

In the examples described herein, when interpolation is used to propagate object detections from adjacent frames, the object detector may be run at ½ or ⅓ the frame rate of the video thereby providing data throughput of 2× or 3×, respectively. In other example implementations, object detections may be propagated distances larger than 1 to achieve even greater throughput.

In conventional object detection systems, a CNN type of still image detector requires approximately 14 ms to process a frame with an input image size of 224×224 pixels. As the image size is increased to greater resolutions such as High-Definition (HD) or Ultra-HD (UHD), the compute time of the object detection system increases dramatically thereby further lowering the frames per second (fps) that are processed. As an example, a conventional object detection system using a CNN type of still image detector requires approximately 60 ms to process an input image of 608×608 pixels, providing a throughput of 16 fps. The example implementations described within this disclosure, which duty cycle the object detector to run at ⅓ of the rate of the video with an interpolation distance of 1, are capable of processing a frame of 608×608 in 20 ms thereby providing 50 fps throughput. A 50 fps throughput is considered real-time performance. The example implementations described herein are capable of providing such real-time performance while maintaining or surpassing the accuracy achieved by the conventional system.

For purposes of illustration, an example implementation of the object detection system implemented using the "You Only Look Once v2" or "YOLOv2" real-time object detector trained on the 2015 ImageNet VID dataset was implemented. With the object detector duty cycled to ½ rate, the interpolation distance set to 1, and the depth of sequential-NMS set to 5, the object detection system achieved a slightly higher mAP score (e.g., better by approximately 1%) over the base detector running at full rate.

Figure 3:
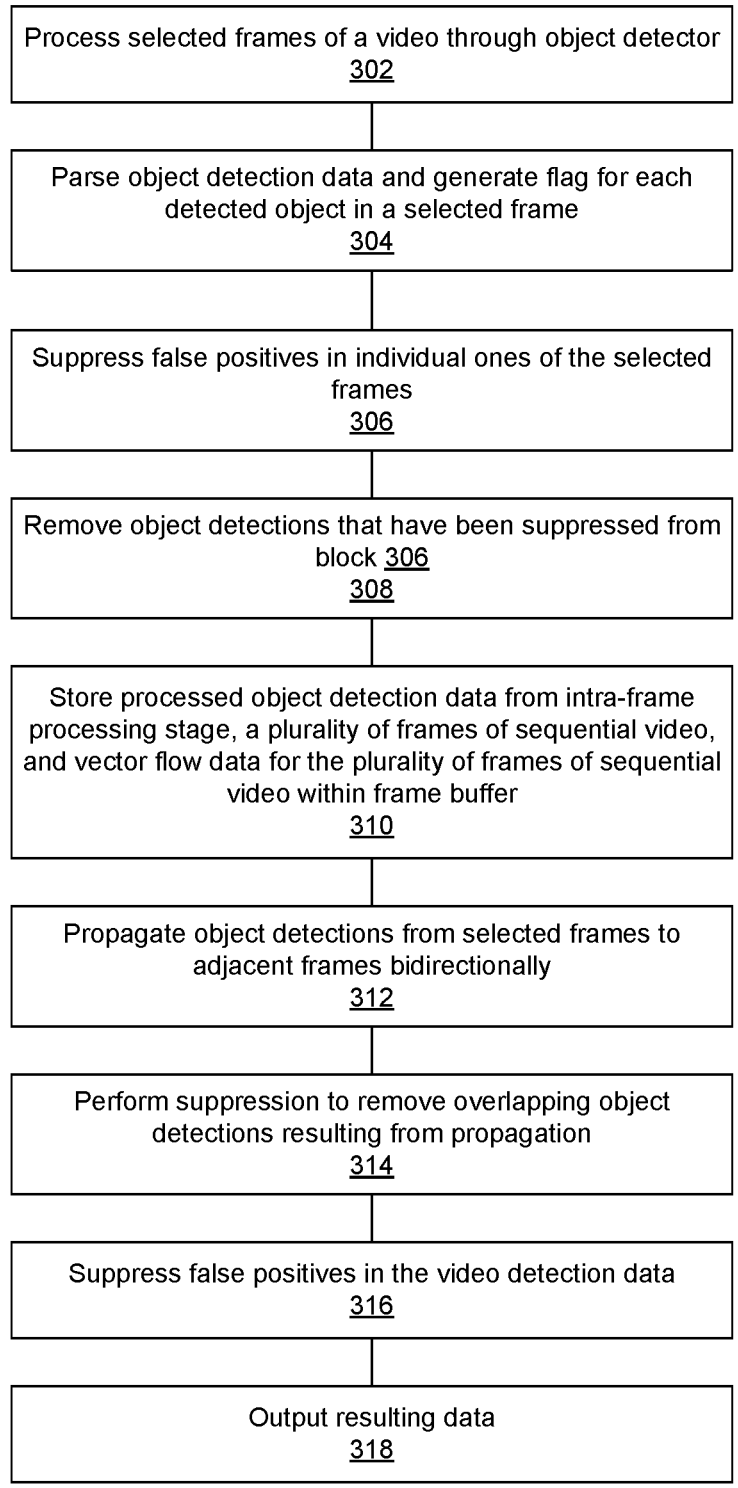
FIG. 3 illustrates an example method of detecting objects within video.

FIG. 3 illustrates an example method 300 of detecting objects within video. Method 300 may be implemented by a system as described herein in connection with FIGS. 1-2.

In block 302, an object detector processes selected frames of a video. The object detector may be a still image detector. The object detector may operate in a duty cycled fashion where the object detector generates object detection data for every Nth frame of video (e.g., for selected non-adjacent frames of video) in a set of adjacent or sequential frames of video.

Starting in block 304, the system begins processing frames that underwent object detection in block 302, e.g., the selected frames, through an intra-frame processing stage. In block 304, the system is capable of parsing the object detection data. The system is capable of parsing the output layer generated by a CNN type of object detector. The system is capable of extracting the object detections from feature maps generated as output by the object detector. The system is further capable of adding a flag and setting the flag for each of the object detections in the frames received from the still image detector.

In block 306, the system is capable of suppressing false positives in individual ones of the selected frames. The system, for example, suppresses false positives using a process referred to as non-maximal suppression that analyzes the class probability for each object detection and reduces the class probability of each object detection that does not exceed a threshold class probability. The system is also capable of suppressing false positives by performing suppression of overlapping detected objects within each individual frame. In block 308, the system is capable of removing object detections that were suppressed in block 306.

Starting in block 310, the system begins implementation of an inter-frame processing stage. In block 310, the system is capable of storing processed object detection data after implementation of block 308 as generated from the intra-frame processing stage, frames of sequential video, and vector flow data for a plurality of sequential frames of video within a frame buffer.

In block 312, the system is capable of propagating object detections in the selected frames to adjacent frames bidirectionally. The system propagates each object detection in one of the selected frames to one or more frames immediately prior to the selected frame and to one or more frames immediately following the selected frame. The number of frames to which each object detection is propagated is specified by the distance metric. As discussed, object detections are propagated from each selected frame to a location in the adjacent, or neighboring, frames based upon the vector flow data for each of the object detections. Propagating the object detections to adjacent frames bidirectionally addresses, e.g., reduces or fixes, the false negatives that occur due to only performing still object detection on a limited number of frames (e.g., the selected frames).

In block 314, the system is capable of performing suppression to remove overlapping object detections that may result from propagation. In block 316, the system is capable of suppressing false positives in the video detection data. For example, the system is capable of building a graph connecting the bounding boxes of object detections corresponding to the same semantic object in a sequence of different frames, where the number of frames in the sequence is set by the depth of the sequential-NMS. The system further determines an optimal sequence of bounding boxes through the frames from one endpoint of the sequence of frames to the next endpoint and suppresses those object detections not used in the optimal sequence. As discussed, in determining the optimal sequence, the system is capable of giving greater weight, or priority, to original object detections as compared to propagated object detections.

In block 318, the system is capable of outputting resulting data. In one example implementation, the system is capable of outputting data from any of a variety of different points of the data pipeline within the post-processor. For example, the system may be configured to output the resulting data after performing pruning as described in connection with block 308. In another example, the system may be configured to output the resulting data after propagating object detections as described in connection with block 312 or after performing suppression as described in connection with block 314. In another example, the system may be configured to output the resulting data after suppressing false positives as described in connection with block 316.

FIG. 4 illustrates another example method 400 of detecting objects within video. Method 400 may be performed by a system as described herein in connection with FIGS. 1 and 2.

In block 402, the system receives object detections for a plurality of selected frames of video from a still image detector. The object detection data may specify zero, one or more object detections in each of the selected frames. In one aspect, the selected frames may be non-sequential frames of the video. In another aspect, method 400 may be performed where the selected frames of video are sequential frames (e.g., where the still image detector is not duty cycled).

In block 404, the system is capable of propagating the object detections from the plurality of selected frames to sequential frames of the video adjacent to the plurality of selected frames (e.g., adjacent to each of the plurality of selected frames) based on a distance metric and vector flow data for the sequential frames. For example, the system propagates object detections from each selected frame to other adjacent frames in each direction that have not undergone object detection through the still image detector. Appreciably, when the object detector is not duty cycled, the object detections are propagated to other adjacent frames in each direction that have undergone object detection. In any case, the system performs object detection propagation using vector flow data determined for the sequential frames of video involved in the propagation. The system is capable of clearing the flag of the object detection that is propagated to a frame. For example, the system is capable of generating a copy of the object detection for the frame to which the object detection is propagated and clearing the flag in the copy of the object detection. Further, the number of adjacent frames to which object detections in the selected frame are propagated in each direction (e.g., forward and backward in the sequence) is determined based on the distance metric.

In block 406, the system is capable of suppressing false positive object detections from the propagating performed in block 404. For a given selected frame, the system uses a set of sequential frames including the selected frame where the number of sequential frames in the set is specified by the depth setting. The depth setting used for suppressing false positive object detections is dependent on the distance metric used in block 404.

In block 408, the system is capable of outputting the resulting object detections for frames of the video. The resulting object detections may be synchronized with the sequential frames of video that are output.

Figure 5:
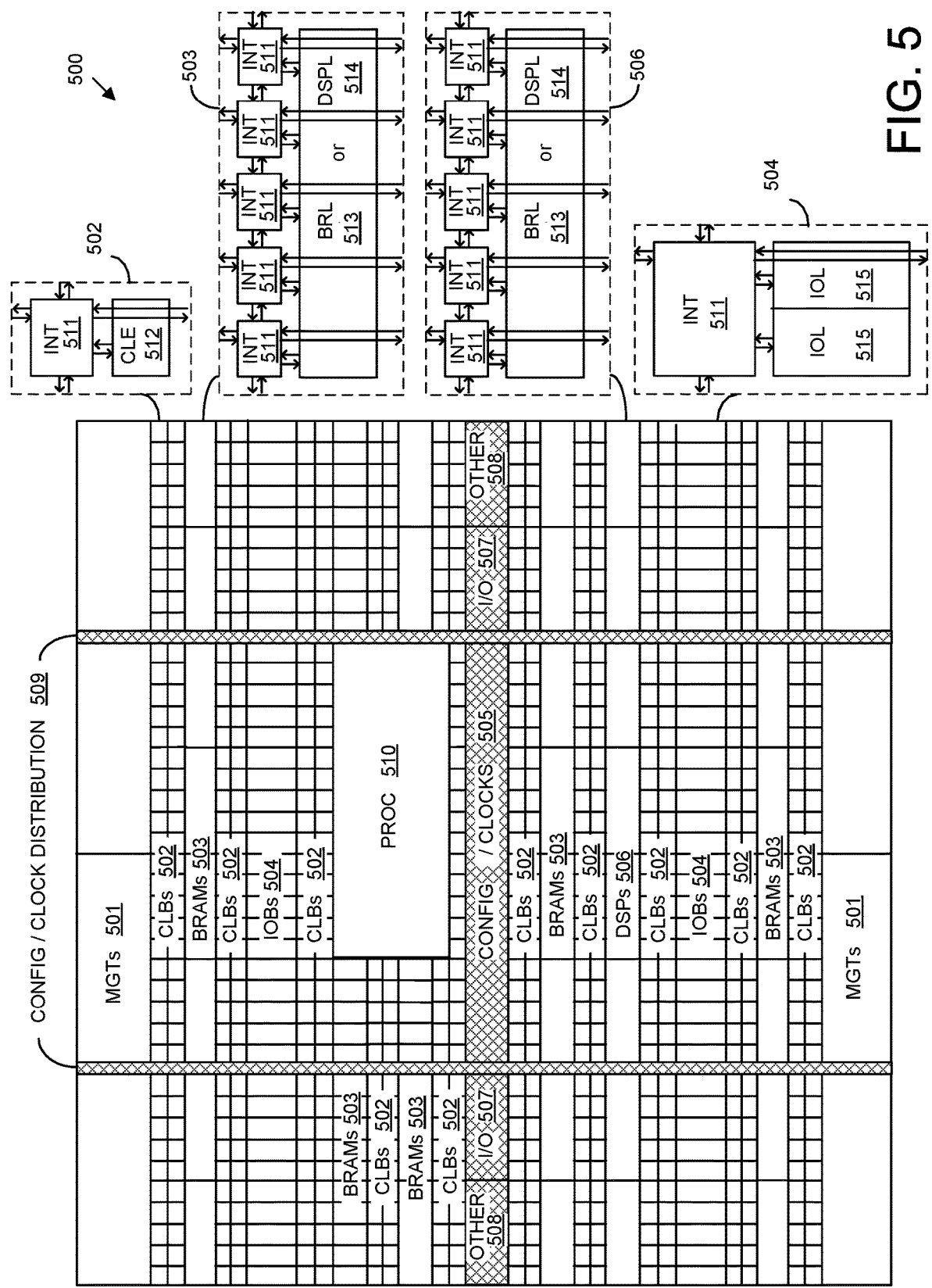
FIG. 5 illustrates an example System-on-Chip implementation of an object detection system for processing video.

FIG. 5 illustrates an example architecture 500 for an IC. In one aspect, architecture 500 may be implemented within a programmable IC. For example, architecture 500 may be used to implement a field programmable gate array (FPGA). Architecture 500 may also be representative of a System-on-Chip (SoC) type of IC. An SoC is an IC that includes a processor that executes program code and one or more other circuits. The other circuits may be implemented as hard-wired circuitry, programmable circuitry, and/or a combination thereof. The circuits may operate cooperatively with one another and/or with the processor.

An object detection system as described herein in connection with FIGS. 1-4 may be implemented in an IC as described in connection with FIG. 5. For example, one or more elements of the object detection system may be implemented using programmable circuitry available in the IC while one or more other elements of the object detection system may be implemented as program code and executed by a processor included within the IC.

As shown, architecture 500 includes several different types of programmable circuit, e.g., logic, blocks. For example, architecture 500 may include a large number of different programmable tiles including multi-gigabit transceivers (MGTs) 501, configurable logic blocks (CLBs) 502, random access memory blocks (BRAMs) 503, input/output blocks (IOBs) 504, configuration and clocking logic (CONFIG/CLOCKS) 505, digital signal processing blocks (DSPs) 506, specialized I/O blocks 507 (e.g., configuration ports and clock ports), and other programmable logic 508 such as digital clock managers, analog-to-digital converters, system monitoring logic, and so forth.

In some ICs, each programmable tile includes a programmable interconnect element (INT) 511 having standardized connections to and from a corresponding INT 511 in each adjacent tile. Therefore, INTs 511, taken together, implement the programmable interconnect structure for the illustrated IC. Each INT 511 also includes the connections to and from the programmable logic element within the same tile, as shown by the examples included at the top of FIG. 5.

For example, a CLB 502 may include a configurable logic element (CLE) 512 that may be programmed to implement user logic plus a single INT 511. A BRAM 503 may include a BRAM logic element (BRL) 513 in addition to one or more INTs 511. Typically, the number of INTs 511 included in a tile depends on the height of the tile. As pictured, a BRAM tile has the same height as five CLBs, but other numbers (e.g., four) also may be used. A DSP tile 506 may include a DSP logic element (DSPL) 514 in addition to an appropriate number of INTs 511. An IOB 504 may include, for example, two instances of an I/O logic element (IOL) 515 in addition to one instance of an INT 511. The actual I/O pads connected to IOL 515 may not be confined to the area of IOL 515.

In the example pictured in FIG. 5, a columnar area near the center of the die, e.g., formed of regions 505, 507, and 508, may be used for configuration, clock, and other control logic. Horizontal areas 509 extending from this column may be used to distribute the clocks and configuration signals across the breadth of the programmable IC.

Some ICs utilizing the architecture illustrated in FIG. 5 include additional logic blocks that disrupt the regular columnar structure making up a large part of the IC. The additional logic blocks may be programmable blocks and/or dedicated circuitry. For example, a processor block depicted as PROC 510 spans several columns of CLBs and BRAMs.

In one aspect, PROC 510 may be implemented as dedicated circuitry, e.g., as a hardwired processor, that is fabricated as part of the die that implements the programmable circuitry of the IC. PROC 510 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 510 may be omitted from architecture 500 and replaced with one or more of the other varieties of the programmable blocks described. Further, such blocks may be utilized to form a "soft processor" in that the various blocks of programmable circuitry may be used to form a processor that can execute program code as is the case with PROC 510.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 5 that are external to PROC 510 such as CLBs 502 and BRAMs 503 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 510.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 510 or a soft processor. In some cases, architecture 500 includes a dedicated configuration processor that loads the configuration bitstream to the appropriate configuration memory and/or processor memory. The dedicated configuration processor does not execute user-specified program code. In other cases, architecture 500 may utilize PROC 510 to receive the configuration bitstream, load the configuration bitstream into appropriate configuration memory, and/or extract program code for execution.

FIG. 5 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 5 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 510 within the IC are for purposes of illustration only and are not intended as limitations.

In one example, object detector 120 and optical flow hardware 122 are implemented within programmable circuitry of an IC using the example architecture 500. Post processor 130 may be implemented using PROC 510 configured to execute program code that performs the operations described in connection with intra-frame processing stage 202 (e.g., extractor 206, NMS 208, and pruner 210) and inter-frame processing stage 204 (e.g., frame buffer 212, MGP 214, and sequential-NMS 216). Frame buffer 212 may be implemented in programmable circuitry accessible by PROC 510, using a hardwired memory (not shown) implemented as part of PROC 510, and/or an external memory (e.g., a RAM). Selector 218 may also be implemented by PROC 510 to output a selected type of data.

Figure 6:
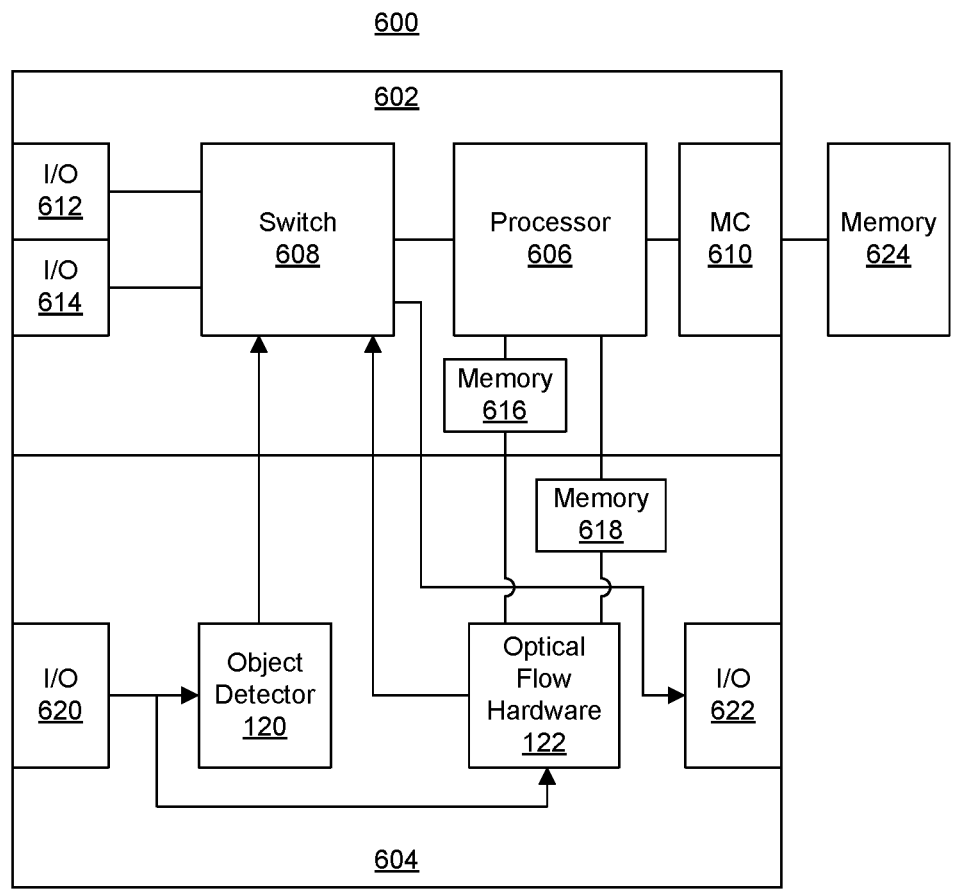
FIG. 6 illustrates another example implementation of an object detection system for processing video.

FIG. 6 illustrates an example SoC 600 implementation of an object detection system for processing video. In the example of FIG. 6, SoC 600 includes a processor system 602 and a region of programmable circuitry 604 coupled to processor system 602. Processor system 602 may be coupled to programmable circuitry 604 through various interconnect circuits.

As discussed, processor system 602 may be implemented as hardwired circuitry. Processor system 602 includes a processor 606 coupled to a switch 608 and a memory controller (depicted as "MC") 610. Switch 608 is coupled to a plurality of I/O devices illustrated as I/Os 612 and 614. Example implementations of I/Os 612 and 614 include, but are not limited to, Universal Serial Bus (USB), Peripheral Component Interconnect Express (PCIe), Universal Asynchronous Receiver/Transmitter (UART), and the like. Processor system 602 may include a memory 616 coupled to processor 606 and to programmable circuitry 604. Processor system 602 may also couple to an off-chip memory shown as memory 624 through memory controller 610.

Programmable circuitry 604 may include one or more I/Os 620, 622 implemented using multi-gigabit transceivers. As shown, object detector 120 and optical flow hardware 122 are implemented using programmable circuitry 604. Programmable circuitry 600 further may include memory 618.

In the example of FIG. 6, sequential frames of video may be received through I/O 620 and provided to object detector 120. The sequential frames of video may also be provided to optical flow hardware 122. Object detector 120 operates on the received video and generates object detection data 124 that is provided to processor 606 through switch 608. As noted, object detector 120 operates on each Nth frame of video. Processor 606 implements post-processor 130. As discussed, post-processor 130 may be implemented as described in connection with FIG. 2.

For purposes of illustration, frame buffer 212 may be implemented using memory 616, memory 618, memory 624, or any combination thereof. Optical flow hardware 122 generates optical flow data 126 that is provided to processor 606. Processor 606 is capable of outputting the resulting data, e.g., frames of sequential video and object detection data synchronized with the frames, through I/O 622 by way of switch 608.

The example of FIG. 6 is provided for purposes of illustration and not limitation. In other examples, video data may be received via I/O 612 or I/O 614 and provided to object detector 120, optical flow hardware 122, and processor 606 for processing. Results generated by processor 606 may be output via I/O 612 or I/O 614.

Figure 7:
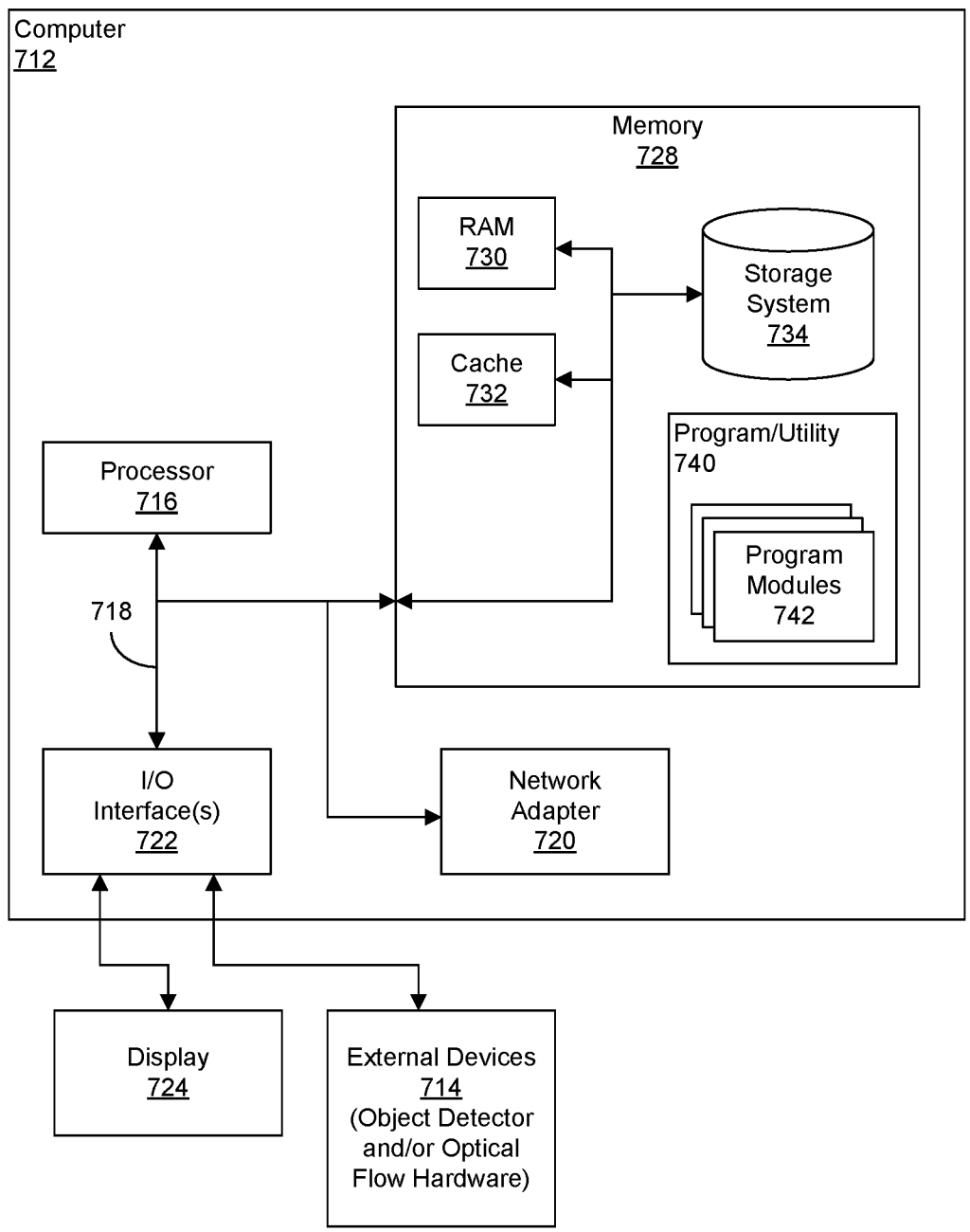
FIG. 7 illustrates another example implementation of an object detection system for processing video.

FIG. 7 illustrates another example implementation of an object detection system 700 for processing video. In the example of FIG. 7, the processor-based portion of object detection system 700 is implemented using a computer 712 while the object detector and/or optical flow hardware are implemented in other devices (e.g., ICs) that may be coupled to computer 712 as external devices 714.

Computer 712 is one example implementation of a computing node that can be used in a standalone capacity, as part of a computing cluster, or as a cloud computing node. The example of FIG. 7 is not intended to suggest any limitation as to the scope of use or functionality of the implementations described herein. Computer 712 is an example of a system and/or computer hardware that is capable of performing the various operations described within this disclosure.

Computer 712 may be operational with numerous other general purpose or special purpose computing system environments or configurations. Examples of computing systems, environments, and/or configurations that may be suitable for use with computer 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer 712 can be described in the general context of computer system-executable instructions, such as program modules, being executed by a computer system. Generally, program modules can include routines, programs, objects, components, logic, data structures, and so on that perform particular tasks or implement particular abstract data types. Computer 712 can be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer 712 includes components, which can include, but are not limited to, one or more processors 716, a memory 728, and a bus 718 that couples various system components including memory 728 to processor 716. Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer 712 typically includes a variety of computer system readable media. Such media may be any available media that is accessible by computer 712 and can include both volatile and non-volatile media, removable and non-removable media. Memory 728 can include computer system readable media in the form of volatile memory, such as random-access memory (RAM) 730 and/or cache memory 732. Computer 712 can also include other removable/non-removable, volatile/non-volatile computer system storage media. By way of example, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 can include at least one program product having a set (e.g., at least one) of program modules that are configured to carry out the functions of the inventive arrangements described herein.

Program/utility 740, having a set (at least one) of program modules 742, may be stored in memory 728 by way of example, and not limitation, as well as an operating system, one or more application programs, other program modules, and program data. Program modules 742 generally carry out the functions and/or operations described herein.

For example, one or more of the program modules can perform the various operations described within this disclosure in connection with post-processor 130. Program/utility 740 is executable by processor 716. Program/utility 740 and any data items used, generated, and/or operated upon by computer 712 are functional data structures that impart functionality when employed by computer 712. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 712 may be coupled to a display 724. Computer 712 may also be coupled to one or more external devices 714. Examples of external devices may include, but are not limited to, a keyboard, a pointing device, object detection hardware, and/or optical flow hardware. Object detection hardware and/or optical flow hardware may be implemented in an IC such as the example ICs and/or architecture described in connection with FIGS. 4-6 and/or other hardwired/dedicated ICs, digital signal processors, graphics processors, or the like.

External devices may also include one or more devices that enable a user to interact with computer 712 and/or any devices (e.g., network card, modem, etc.) that enable computer 712 to communicate with one or more other computing devices. Such communication can occur via Input/Output (I/O) interfaces 722. Still yet, computer 712 can communicate with one or more networks such as a local area network (LAN), a general wide area network (WAN), and/or a public network (e.g., the Internet) via network adapter 720. As depicted, network adapter 720 communicates with the other components of computer 712 via bus 718. It should be understood that although not shown, other hardware and/or software components could be used in conjunction with computer 712. Examples, include, but are not limited to: microcode, device drivers, redundant processing units, external disk drive arrays, RAID systems, tape drives, and data archival storage systems, etc.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "real-time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method may include receiving object detections for a plurality of selected frames of a video from a still image detector, wherein the plurality of selected frames are non-adjacent frames of the video, propagating the object detections from the plurality of selected frames to sequential frames of the video adjacent to the plurality of selected frames based on a distance metric and vector flow data for the sequential frames, suppressing false positive object detections from the propagating, and outputting resulting object detections for the sequential frames of the video.

In one aspect, the method may include processing the object detections through an intra-frame processing flow prior to the propagating.

In another aspect, the still image detector operates at a frame rate that is less than a frame rate of the video.

In another aspect, the plurality of selected frames include Nth frames of the video, where N is an integer value of 2 or more.

In another aspect, the still image detector is implemented as a convolutional neural network.

In another aspect, the distance metric specifies a number of the sequential frames adjacent to each of the plurality of selected frames to propagate the object detections of the plurality of selected frames.

In another aspect, a depth setting specifies a number of the sequential frames included in a set for performing the suppressing of false positives.

In another aspect, the depth setting depends on the distance metric used for the propagating.

In another aspect, the method may include performing a dense optical flow on the video to generate the vector flow data.

A system includes a processor configured to initiate operations. The operations may include receiving object detections for a plurality of selected frames of a video from a still image detector, wherein the plurality of selected frames are non-adjacent frames of the video, propagating the object detections from the plurality of selected frames to sequential frames of the video adjacent to the plurality of selected frames based on a distance metric and vector flow data for the sequential frames, suppressing false positive object detections from the propagating, and outputting resulting object detections for the sequential frames of the video.

In one aspect, the processor is configured to initiate executable operations that may include processing the object detections through an intra-frame processing flow prior to the propagating.

In another aspect, the still image detector operates at a frame rate that is less than a frame rate of the video.

In another aspect, the plurality of selected frames include Nth frames of the video, where N is an integer value of 2 or more.

In another aspect, the still image detector is implemented as a convolutional neural network.

In another aspect, the distance metric specifies a number of the sequential frames adjacent to each of the plurality of selected frames to propagate the object detections of the plurality of selected frames.

In another aspect, a depth setting specifies a number of the sequential frames included in a set for performing the suppressing of false positives.

In another aspect, the depth setting depends on the distance metric used for the propagating.

In another aspect, the processor is configured to initiate executable operations that may include performing a dense optical flow on the video to generate the vector flow data.

A computer program product includes a computer readable storage medium having program code stored thereon. The program code is executable by a processor to perform operations. The operations may include receiving object detections for a plurality of selected frames of a video from a still image detector, wherein the plurality of selected frames are non-adjacent frames of the video, propagating the object detections from the plurality of selected frames to sequential frames of the video adjacent to the plurality of selected frames based on a distance metric and vector flow data for the sequential frames, suppressing false positive object detections from the propagating, and outputting resulting object detections for the sequential frames of the video.

A method may include receiving object detections for a plurality of sequential frames of a video from a still image detector and, for each sequential frame of the plurality of sequential frames, propagating an object detection to frames adjacent to the sequential frame using motion guided propagation and a selected distance metric. The method may include suppressing false positive object detections from the propagating and outputting resulting object detections for the plurality of frames of the video.

In an aspect, the distance metric specifies a number of frames adjacent to each sequential frame of the plurality of sequential frames to propagate the object detections.

In another aspect, a depth setting specifies a number of the plurality of frames included in a set for performing the suppressing of false positives, and wherein the depth setting depends on the distance metric used for the propagating.

Other aspects may include a system having a processor configured to initiate the various operations described herein and/or a computer program product having a computer readable storage medium having program code stored thereon, wherein the program code is executable by a processor to perform any of the various operations described herein.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
    receiving object detections for a plurality of selected frames of a video from a still image detector, wherein the plurality of selected frames are non-adjacent frames of the video;
    propagating the object detections from the plurality of selected frames to sequential frames of the video adjacent to the plurality of selected frames based on a distance metric and vector flow data for the sequential frames;
    suppressing false positive object detections from the propagating;
    wherein a depth setting specifies a number of the sequential frames included in a set for performing the suppressing false positive object detections, wherein the depth setting depends on the distance metric used for the propagating; and
    outputting resulting object detections for the sequential frames of the video.

2. The method of claim 1, further comprising:
    processing the object detections through an intra-frame processing flow prior to the propagating.

3. The method of claim 1, wherein the still image detector operates at a frame rate that is less than a frame rate of the video.

4. The method of claim 1, wherein the plurality of selected frames include Nth frames of the video, where N is an integer value of 2 or more.

5. The method of claim 1, wherein the still image detector is implemented as a convolutional neural network.

6. The method of claim 1, wherein the distance metric specifies a number of the sequential frames adjacent to each of the plurality of selected frames to propagate the object detections of the plurality of selected frames.

7. The method of claim 1, further comprising:
    performing a dense optical flow on the video to generate the vector flow data.

8. A system, comprising:
    a processor configured to initiate executable operations including:
    receiving object detections for a plurality of selected frames of a video from a still image detector, wherein the plurality of selected frames are non-adjacent frames of the video;
    propagating the object detections from the plurality of selected frames to sequential frames of the video adjacent to the plurality of selected frames based on a distance metric and vector flow data for the sequential frames;
    suppressing false positive object detections from the propagating;
    wherein a depth setting specifies a number of the sequential frames included in a set for performing the suppressing false positive object detections, wherein the depth setting depends on the distance metric used for the propagating; and outputting resulting object detections for the sequential frames of the video.

9. The system of claim 8, wherein the processor is configured to initiate executable operations further comprising:

processing the object detections through an intra-frame processing flow prior to the propagating.

10. The system of claim 8, further comprising:

the still image detector implemented as a circuit coupled to the processor.

11. The system of claim 10, wherein the still image detector is implemented in programmable circuitry.

12. The system of claim 10, wherein the still image detector operates at a frame rate that is less than a frame rate of the video.

13. The system of claim 10, wherein the plurality of selected frames include Nth frames of the video, where N is an integer value of 2 or more.

14. The system of claim 8, wherein the distance metric specifies a number of the sequential frames adjacent to each of the plurality of selected frames to propagate the object detections of the plurality of selected frames.

15. The system of claim 8, further comprising:

a circuit coupled to the processor and configured to perform a dense optical flow to generate the vector flow data.

* * * * *